United States Patent
Liao

(10) Patent No.: US 9,173,099 B2
(45) Date of Patent: Oct. 27, 2015

(54) METHOD OF SUBSCRIPTION CONTROL IN A MOBILE COMMUNICATION SYSTEM

(75) Inventor: Ching-Yu Liao, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 13/434,877

(22) Filed: Mar. 30, 2012

(65) Prior Publication Data
US 2013/0078950 A1    Mar. 28, 2013

Related U.S. Application Data

(60) Provisional application No. 61/469,093, filed on Mar. 30, 2011.

(51) Int. Cl.
*H04W 12/08* (2009.01)
*H04W 4/00* (2009.01)

(52) U.S. Cl.
CPC .............. *H04W 12/08* (2013.01); *H04W 4/005* (2013.01)

(58) Field of Classification Search
CPC ...... H04W 4/005; H04W 24/02; H04W 12/08
USPC .............. 455/403, 410, 411, 420, 414.1, 433, 455/435.1, 450; 370/229, 230, 310, 312, 370/328, 329, 389
See application file for complete search history.

(56) References Cited

U.S. PATENT DOCUMENTS

| | | | |
|---|---|---|---|
| 2009/0094256 A1 | 4/2009 | Van Coller | |
| 2011/0235581 A1* | 9/2011 | Diachina et al. | 370/328 |
| 2012/0106431 A1 | 5/2012 | Wu | |
| 2012/0264451 A1* | 10/2012 | Kim et al. | 455/456.1 |
| 2013/0003656 A1* | 1/2013 | Cho et al. | 370/328 |

FOREIGN PATENT DOCUMENTS

| | | |
|---|---|---|
| CN | 101932068 A | 12/2010 |
| CN | 101959133 A | 1/2011 |
| EP | 2445165 A1 | 4/2012 |
| WO | 2011029395 A1 | 3/2011 |

OTHER PUBLICATIONS

3GPP TR 23.888 V1.0.0 (Jul. 2010) 3rd Generation Partnership Project; technical Specification Group Services and System Aspects; System Improvements for Machine-Type Communications; (Release 10).*

(Continued)

*Primary Examiner* — Dinh P Nguyen
(74) *Attorney, Agent, or Firm* — Winston Hsu; Scott Margo

(57) ABSTRACT

A method of subscription control for a first network control node in a mobile communication environment is disclosed. The method comprises receiving a trigger request message for triggering a mobile communication device from a machine-type communication (MTC) server, determining whether the trigger request message is valid according to whether one or more MTC features required by an application indicated in the trigger request message is subscribed or activated by the mobile communication device and is supported by a network control node of the mobile communication system, and accepting the trigger request message and forwarding the trigger request message to the network control node when the trigger request message is determined to be valid.

5 Claims, 6 Drawing Sheets

(56) References Cited

OTHER PUBLICATIONS

3GPP TS 23.401 V10.3.0 (Mar. 2011) Technical Specification 3rd Generation Partnership Project;Technical Specification Group Services and System Aspects;General Packet Radio Service (GPRS) enhancements for Evolved Universal Terrestrial Radio Access Network (E-UTRAN) access (Release 10).

3GPP TR 23.888 V1.1.1 (Apr. 2011)Technical Report 3rdGeneration Partnership Project;Technical Specification Group Services and System Aspects;System Improvements for Machine-Type Communications;(Release 11).

Office action mailed on Jun. 10, 2014 for the Taiwan application No. 101111651, filing date: Mar. 30, 2012, p. 1-8.

Office action mailed on Apr. 24, 2014 for the China application No. 201210090458.1, filed: Mar. 30, 2012.

* cited by examiner

METHOD OF SUBSCRIPTION CONTROL IN A MOBILE COMMUNICATION SYSTEM

CROSS REFERENCE TO RELATED APPLICATIONS

This application claims the benefit of U.S. Provisional Application No. 61/469,093 filed on Mar. 30, 2011 and entitled "Method of subscription control for triggering target UE", the contents of which are incorporated herein.

BACKGROUND OF THE INVENTION

1. Field of the Invention

The invention relates to a method utilized in a mobile communication system, and more particularly, to a method of subscription control of Machine-Type Communication (MTC) in a mobile communication system.

2. Description of the Prior Art

Machine-type communication (MTC) is one type of data communication including one or more entities not requiring human interactions. That is, the MTC refers to the concept of communication based on a network such as the existing GERAN, UMTS, long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has features different from that of a typical MS. Therefore, a service optimized to the MTC may differ from a service optimized to human-to-human communication. In comparison with a current mobile network communication service, the MTC can be characterized as a different market scenario, data communication, less costs and efforts, a potentially great number of MSs for communication, wide service areas, low traffic per MS, etc.

Meanwhile, the number of MTC devices is expected to be much greater than the number of legacy devices, and a probability of performing operations of the plurality of MTC devices simultaneously is high due to a feature of atypical machine-to-machine (M2M) service. M2M communication (also referred to as "machine-type communications" or "MTC") may be used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M devices. Additionally, further enhancements to these technologies may provide additional opportunities for the deployment of M2M-based solutions.

To receive services, e.g. evolved packet system (EPS) services, the UE needs to register with the network. During a registration procedure, e.g. attach procedure, the UE may first send an "ATTACH REQUEST" message to a network entity (e.g. MME). The "ATTACH REQUEST" message includes an international mobile subscriber identity (IMSI), which is stored in a subscriber identity module (SIM) card inside the mobile device, e.g. UE.

According to 3GPP TR 23.888, when an MTC server wants to provide a specific MTC service to an MTC device, the MTC server initiates a device trigger procedure to the MTC device by sending a trigger request message with MTC features which may include essential MTC features mandatorily supported by the network. After the MTC server successfully triggers the MTC device and clears the trigger event, the MTC device initiates a subscription control procedure with a serving mobility management entity (MME)/serving GPRS support node (SGSN) and a home subscriber server (HSS)/home location register (HLR).

However, in the device trigger procedure, the prior art faces some issues due to lack of subscription control for the required MTC features. First, the device trigger procedure lacks of subscription control in the HSS/HLR, which causes the MTC server trigger the target MTC device successfully but the MTC device be unable to start the service later on due to mismatched MTC features in the MTC subscription. Second, when the MTC server triggers the MTC device successfully and the MTC device requests for the triggered service to the serving MME/SGSN, the serving MME/SGSN may reject the requests due to lack of capability for required essential MTC features of the triggering service. Last, if the MTC subscription of the MTC device does not contain required MTC features for the triggering service, the MTC device would get rejection from the serving MME/SGSN and have to quit the triggering service. Such issues result in meaningless signaling overheads and wastes network and radio resources.

SUMMARY OF THE INVENTION

It is therefore a primary objective of the invention to provide a method of subscription control for Machine-Type Communication (MTC) in a mobile communication system.

The invention discloses a method of subscription control for a network gateway node in a mobile communication system, comprising receiving a trigger request message for triggering a mobile communication device from a machine-type communication (MTC) server; determining whether the trigger request message is valid according to whether one or more MTC features required by an application indicated in the trigger request message is subscribed or activated by the mobile communication device and is supported by a network control node of the mobile communication system; and accepting the trigger request message and forwarding the trigger request message to the network control node when the trigger request message is determined to be valid.

The invention further discloses a method of subscription control for a first network control node in a mobile communication system, comprising receiving from a mobile communication device a first non-access stratum (NAS) message containing information of one or more Machine-Type Communication (MTC) features required by an application, wherein the mobile communication device sends the first NAS message when initiating the application in response to receiving a trigger request message from the first network control node; determining whether the one or more MTC features are subscribed according to the first NAS message; and rejecting the trigger request message when at least one of the one or more MTC features is determined not being subscribed.

These and other objectives of the present invention will no doubt become obvious to those of ordinary skill in the art after reading the following detailed description of the preferred embodiment that is illustrated in the various figures and drawings.

DETAILED DESCRIPTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

In order to solve the aforementioned problems, the invention provides methods for handling subscription of MTC features, network/user capabilities when receiving requests for MTC device triggering via a service network.

Figure 1:
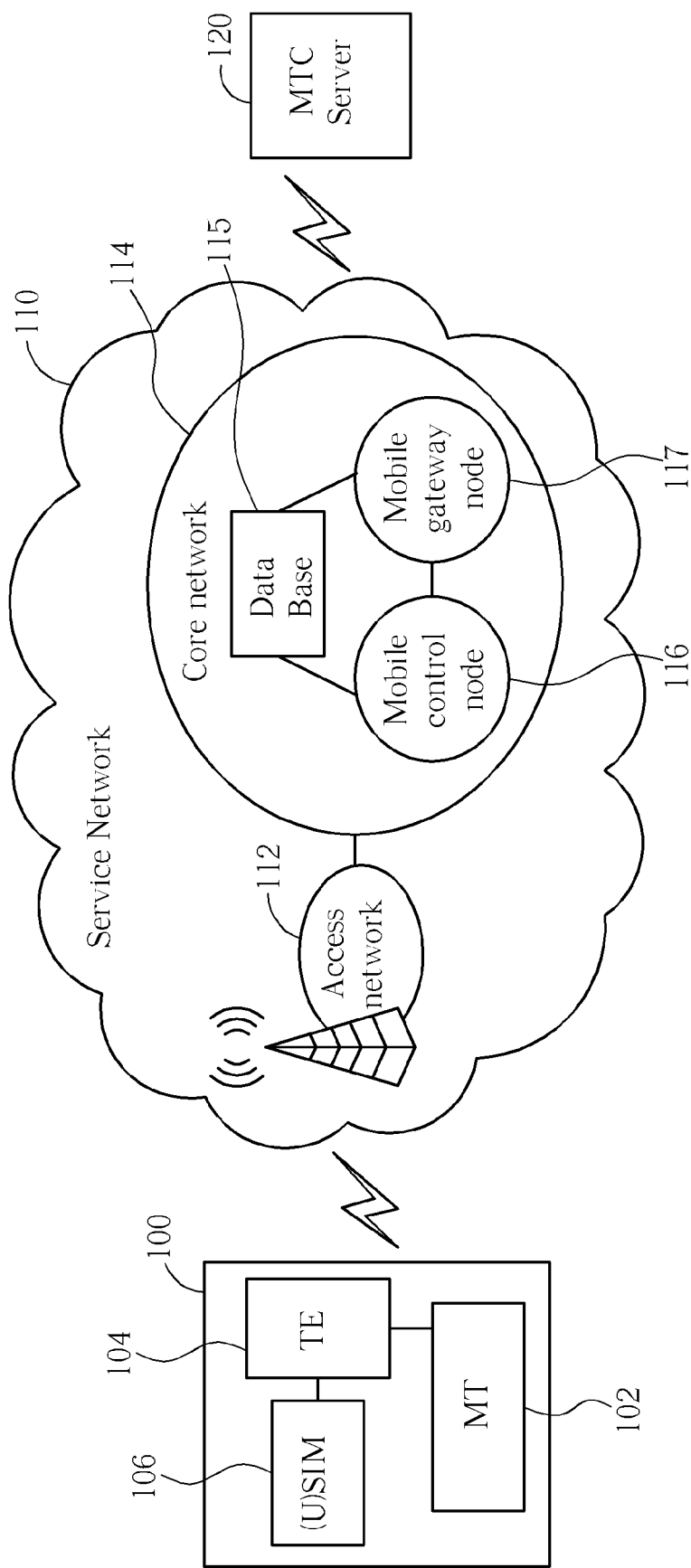
FIG. 1 is an exemplary MTC (Machine Type Communication) architecture of a mobile communication environment of the invention.

FIG. 1 is an exemplary system architecture for MTC which illustrates a mobile communication environment (or mobile communication system) 10 according to an embodiment of the invention. The mobile communication environment 10 includes at least one mobile communication device 100, a service network 110, a MTC server 120 and a number of MTC application servers controlled by a MTC user (not shown). In the mobile communication environment 10, the mobile communication device 100 is wirelessly connected to the service network 110 for obtaining wireless services. The service network 110 comprises an access network (or called radio access network) 112 and a core network 114.

In the mobile communication environment 10, the mobile communication device 100 is configured for MTC and runs an application for MTC. Also, there may be one or more MTC devices, which run MTC applications and are connected to the mobile communication device 100 wirelessly or through wires. The mobile communication device 100 may be a Mobile Station (MS)/User Equipment (UE) which contains a Mobile Terminal (MT) 102, a Terminal Equipment (TE) 104, and a Subscriber Identity Module (SIM) or Universal SIM (USIM) 106. The MT 102 holds all the necessary radio functions to access the service network 110, and the TE 104 provides a service platform for applications.

The mobile communication device 100 may communicate with the MTC server 120 via the service network 110 which may be a 3GPP network, e.g. Global System for Mobile Communication (GSM) network, Universal Mobile Telecommunications System (UMTS) network, or Evolved Packet System (EPS) network. The MTC server 120 may be a server capable of triggering MTC applications (also called MTC services) on the mobile communication device 100, which is further connected to MTC application servers managed by the MTC user (not shown) via certain Application Programming Interfaces (API) and provides triggering services via the service network 110 for the connected MTC application servers. Specifically, in request of any of the connected MTC application servers, the MTC server 120 can send trigger message via the service network 110 to the mobile communication device 100 which is an MS/UE configured for MTC, for executing specific MTC application(s). In the invention, the mobile communication device 100 may be referred to as an MTC device corresponding to the MTC server 120.

The service network 110 may comprise an access network (or called radio access network) 112 and a core network 114, wherein the access network 112 allows connectivity between the mobile communication device 100 and the core network 114 by providing the functionality of wireless transmissions and receptions to and from the mobile communication device 100 for the core network 114, and the core network 114 signals the required operations to the access network 112 for providing wireless services to the mobile communication device 100. The service network 110 may be a network in compliance with the Global System for Mobile Communication (GSM), Universal Mobile Telecommunications System (UMTS), or Evolved Packet System (EPS) technology. The access network 112 may be a GSM Edge Radio Access Network (GERAN) in the GSM technology, a UMTS Terrestrial Radio Access Network (UTRAN) in the WCDMA/HSPA technology, or an Evolved-UTRAN (E-UTRAN) in the LTE/LTE-Advanced technology, and the core network 114 may be a GSM core or a General Packet Radio Service (GPRS) core in the GSM/UMTS system or an Evolved Packet Core (EPC) in the EPS system.

The core network 114 is connected to the access network 112, which may include a network control node 116, e.g. SGSN/MME, serving gateway (S-GW), gateway GPRS support node (GGSN)/PDN gateway (P-GW) or HSS/HLR, for providing various services to the mobile communication device 100. For example, the SGSN or MME/S-GW is the key control node for packet routing and transfer, mobility management (e.g. attach/detach and location management), session management, logical link management, authentication and charging functions, and interfaces an E-UTRAN/UTRAN/GERAN for the creation of relevant radio bearers. The S-GW provides the serving mobile communication device 100 a direct user plane connectivity by being a bridge between the E-UTRAN and P-GW, and it has a control plane interface to the MME for handling mobile terminated calls to reach the mobile communication device 100 in idle mode. The GGSN or P-GW is responsible for inter-working between the UMTS or EPS network and external networks. The HSS/HLR is a central database that contains user-related and subscription-related information. HLR is responsible for enabling subscriber access, which can be considered as a subset of HSS. Functions of HSS/HLR include functionalities such as mobility management, call and session establishment support, user authentication and access authorization. The service-related entity, e.g. the MTC application server or the MTC server 120, may be inside or outside of the service network 110 and may indirectly connect to a network entity, e.g. via network gateway or interworking function after appropriate authorization process, or directly connect to a GGSN/P-GW if a user plane connection is established and remains active. Further, the core network 114 may provide different interfaces to the MTC server 120. The MTC server 120 may transmit a trigger message directly to the service network 110 via SMS or indirectly to an interworking function, e.g. a gateway, to process a service request, e.g. trigger service request, received from a MTC server 120 for further trigger delivery. For the indirect trigger delivery, the interworking function can be an entry point of the service network 110 to the MTC server 120.

The MT 102 of the mobile communication device 100 comprises a wireless module (not shown) for performing the functionality of wireless transmissions and receptions to and from the service network 110, and a controller module (not shown) for controlling the operation of the wireless module (not shown) and other functional components, such as a display unit and/or keypad serving as a man-machine interface (MMI), a storage unit storing the program codes of applications or communication protocols of the GSM/WCDMA/HSPA/LTE/LTE-Advanced technology for the GSM/UMTS/EPS network (including PHY, MAC, RLC, RRC, NAS layers, or others. Although not shown, a subscriber identity card may be provided to be coupled to the controller module (not shown), which stores the International Mobile Subscriber Identity (IMSI), the security keys used for identification and authentication with the service networks, and other operation related data acquired during communications with the service networks, such as the Equivalent PLMN list and Forbidden PLMN list, etc. The subscriber identity card may be a Subscriber Identity Module (SIM) card or a Universal SIM (USIM) card.

Note that, FIG. 1 only illustrates one mobile communication device, one MTC server, one service network including one access network and one core network for simplicity. Any modification or alternation according to the mobile communication environment 10 as shown in FIG. 1 shall be within the scope of the invention.

In the following embodiments, the service network 110 may be a GSM/UMTS/EPS network belonging to a specific PLMN, and the mobile communication device 100 may be a Mobile Station (MS) or User Equipment (UE). The UMTS/EPS network is in compliance with the 3GPP TS 23.060/TS 23.401 specifications, 3GPP TS 24.008/TS 24.301 specifications, 3GPP TS 23.122 and/or other related UMTS/EPS specifications. Based on the technology used, the messages of Mobility Management (MM) operations may correspond to the GSM/UMTS/EPS technology, respectively, e.g. MM message for Location Area Update (LAU) or attach procedure, GMM message for Routing Area Update (RAU) procedure, and EPS Mobility Management (EMM) message for Tracking Area Update (TAU) procedure. Further, the TAU/RAU procedure may be a combined TAU/LAU or combined RAU/LAU procedure in which the TAU/RAU REQUEST message indicates that the mobile communication device 100 wishes to perform TAU/RAU and LAU procedures for a Packet-Switched domain and a Circuit-Switched (CS) domain, respectively. The attach procedure may be an ATTACH REQUEST message for a Circuit-Switched domain service in GSM/UMTS system or for Packet-Switched domain service in UMTS/EPS system. further, the attach procedure may be a combined attach procedure in which the ATTACH REQUEST message indicates that the mobile communication device 100 wishes to start a packet data session and a Circuit-Switched (CS) domain service with the service network 110 for mobile communication services.

In the invention, there may have one or more network nodes in the core network 114 involving the trigger request delivery procedure to receive the trigger request message and forward the trigger request message to the mobile communication device 100, and a data base 115 storing a mapping table between an identifier which can identify a specific service to be triggered on the mobile communication device 100 and the required features, where the data base may be in the network gateway node 117 or in another network node, e.g. HSS/HLR (which may be collocated with the network gateway node 117). For example, a network node which receives a trigger request message from a MTC server is a network gateway node 117, e.g. a device trigger gateway or HSS/HLR, and the network gateway node 117 forwards the trigger request message to a following node which is the network control node 116, e.g. MME/SGSN/MSC. Finally, the network control node 116 delivers the trigger message to a following node which is the mobile communication device 100. Along with the trigger request delivery procedure, the network gateway node 117 and the network control node 116 may append additional information with the trigger request message as a delivery message, where the information may include subscription information, required MTC features.

Figure 2:
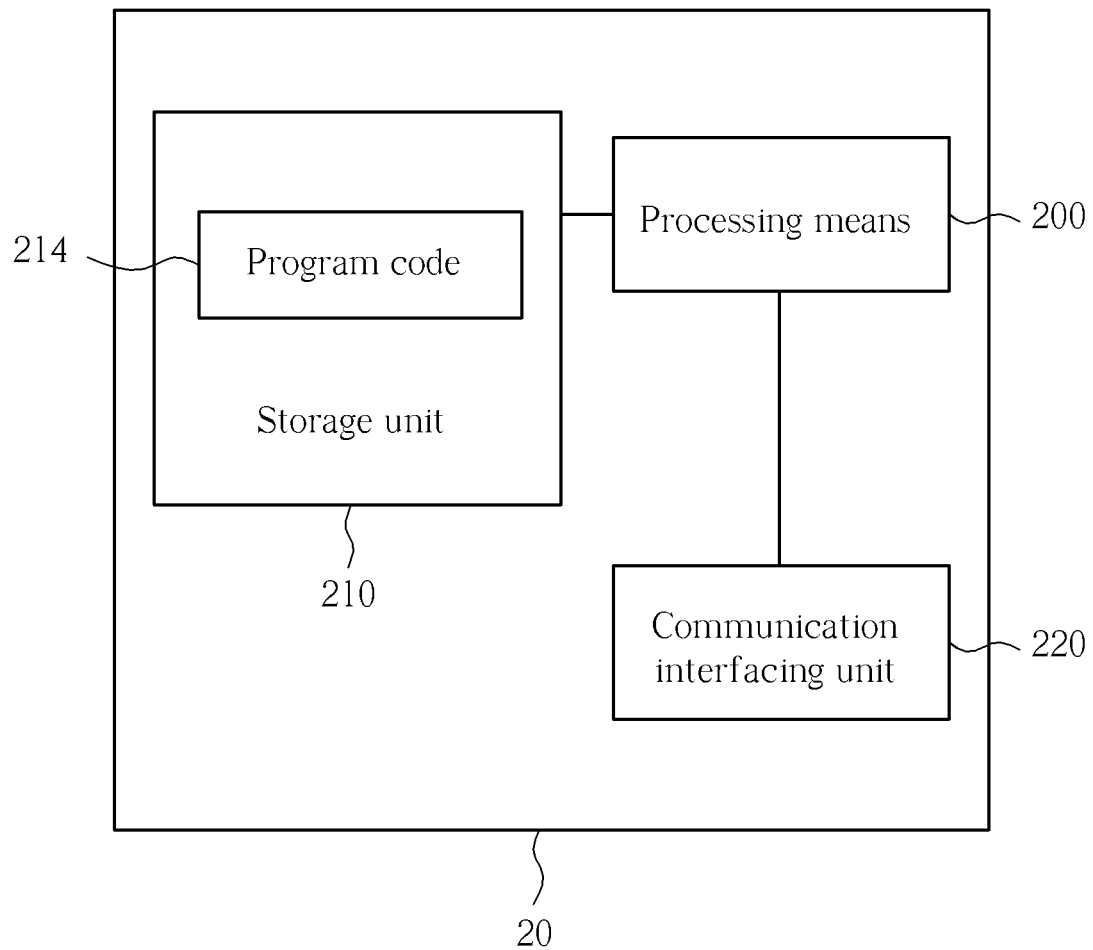
FIG. 2 is a schematic diagram of an exemplary communication device of the invention.

Please refer to FIG. 2, which is a schematic diagram of an exemplary communication device 20. The communication device 20 can be the mobile communication device 100, the network control node 116, the network gateway node 117 or the MTC server 120 shown in FIG. 1, but are not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store program code 214 for access by the processing means 200. Examples of the storage unit 210 include but are not limited to a subscriber identity module (SIM), read-only memory (ROM), random-access memory (RAM), CD-ROMs, magnetic tapes, floppy disks, and optical data storage devices.

Figure 3:
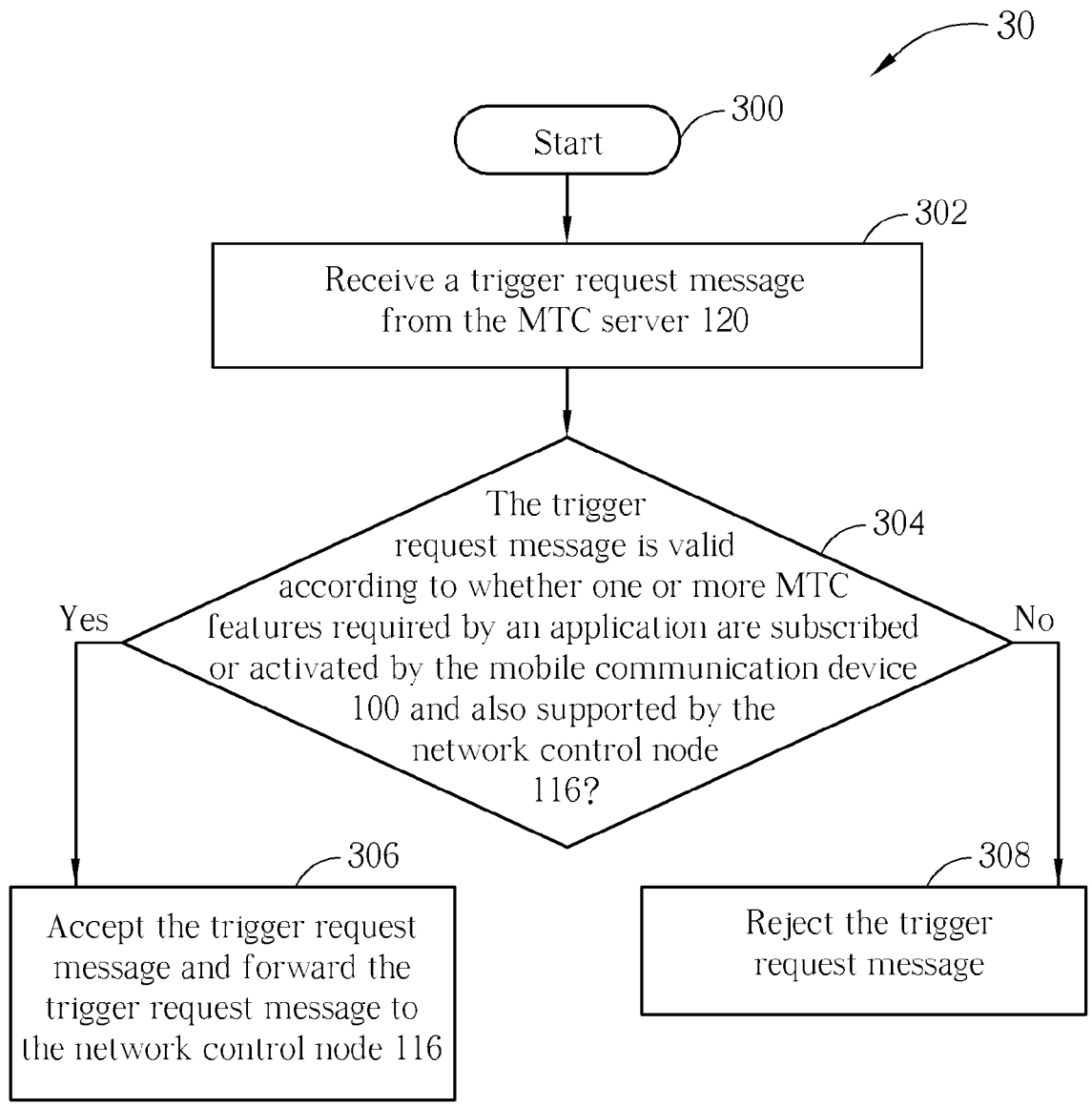
FIGS. 3-6 are flowchart diagrams of exemplary processes of the invention.

Please refer to FIG. 3, which is a flowchart of an exemplary process 30. The process 30 is used for subscription control in the network gateway node 117. The process 30 may be compiled into the program code 214, including the following steps:

Step 300: Start.

Step 302: Receive a trigger request message from the MTC server 120.

Step 304: Determine whether the trigger request message is valid according to whether one or more MTC features required by an application are subscribed or activated by the mobile communication device 100 and also supported by the network control node 116. If yes, go to Step 306; otherwise, go to Step 308.

Step 306: Accept the trigger request message and forward the trigger request message to the network control node 116.

Step 308: Reject the trigger request message.

According to the process 30, the network gateway node 117 receives the trigger request message from the MTC server 120 which wants to provide a specific MTC service to the mobile communication device 100 and then initiates a device trigger procedure to trigger an application on the mobile communication device 100 as indicated by the trigger information contained in the trigger request message. The network gateway node 117 determines whether the trigger request message is valid, i.e., all the MTC features required by the application are subscribed and activated by the mobile communication device 100 and supported by the network control node 116.

The information of required MTC features may be contained in the trigger information and provided by the MTC server 120 to the network gateway node 117. Alternatively, the information of required MTC features may be stored in a data base 115 shown in FIG. 1, and the network gateway node 117 retrieves required information from the data base 115. For the case that the data base 115 is not collocated with network gateway node 117, the network gateway node 117 sends a quarry message with an identifier that can identify the trigger request message, e.g. an MTC identifier. After obtaining the information of required MTC features associated to the trigger application, the network gateway node 117 is able to check the subscription of the mobile communication device 100 and determine whether the trigger request message is valid, i.e. the trigger application and the required MTC features of the trigger application must be subscribed by the mobile communication device 100.

Moreover, to determine if the trigger request message is valid, the network gateway node 117 may also check the capability of the network control node 116 for the essential MTC features to make sure that the serving network node for the mobile communication device 100 is capable of all essential MTC features. If there is more than one serving network control node for the mobile communication device 100, the network gateway node 117 checks the capability of each serving network control node, where the capability of each network control node can be provided to the HSS when the mobile communication device 100 performs an attach/TAU procedure, combined EPS/IMSI attach procedure or combined TAU/LAU procedure. If the network gateway node 117 does not have the information about the capability of the network control node 116 for the required MTC features, the network gateway node 117 includes the information of required MTC features in the trigger request message to the network control node 116. Please note that, if the mobile communication device 100 provides the information about its capability of the enabled MTC features in the attach/TAU procedure to the network control node 116 or the network gateway node 117, the network control node 116 or the network gateway node 117 can also consider the capability of the mobile communication device 100 about the required MTC features of the trigger request message when determining if the trigger request message is valid or not.

If the trigger request message is determined to be valid based on the capability of network control node 116 for the mobile communication device 100, the network node, e.g. network gateway node 117 or network control node 116, accepts the trigger request message, and forwards the trigger request message to the following node. Otherwise, the network node rejects the trigger request message. For example, if the network node is network gateway node 117, the following node is the serving network control node 116, e.g. MME/SGSN/MSC; if the network node is network control node 116, the following node is the MTC mobile communication device 100.

Specifically, the required MTC features may include one or more essential MTC features. The network node, e.g. network gateway node 117 or network control node 116, reject the trigger request message if at least one of the essential MTC features is not subscribed by the mobile communication device or is not supported by the network control node 116 or the mobile communication device 100.

The invention is for saving network resource and radio resource that will be used to deliver the trigger request message. That is, before continuing to deliver the trigger request message to a following node, the network node, e.g. network gateway node 117 or network control node 116, needs to make sure that the trigger request message to be delivered is with valid subscription for the required MTC features, and can be performed successfully by the mobile communication device 100, and can be supported by a network control node. Therefore, after the mobile communication device 100 receives the trigger request message, the mobile communication device 100 can execute the application with required MTC features as indicated in the trigger request message successfully, and the serving network control node for the mobile communication device 100 is capable of providing required MTC features to handle the corresponding response message from the mobile communication device 100.

Figure 4:
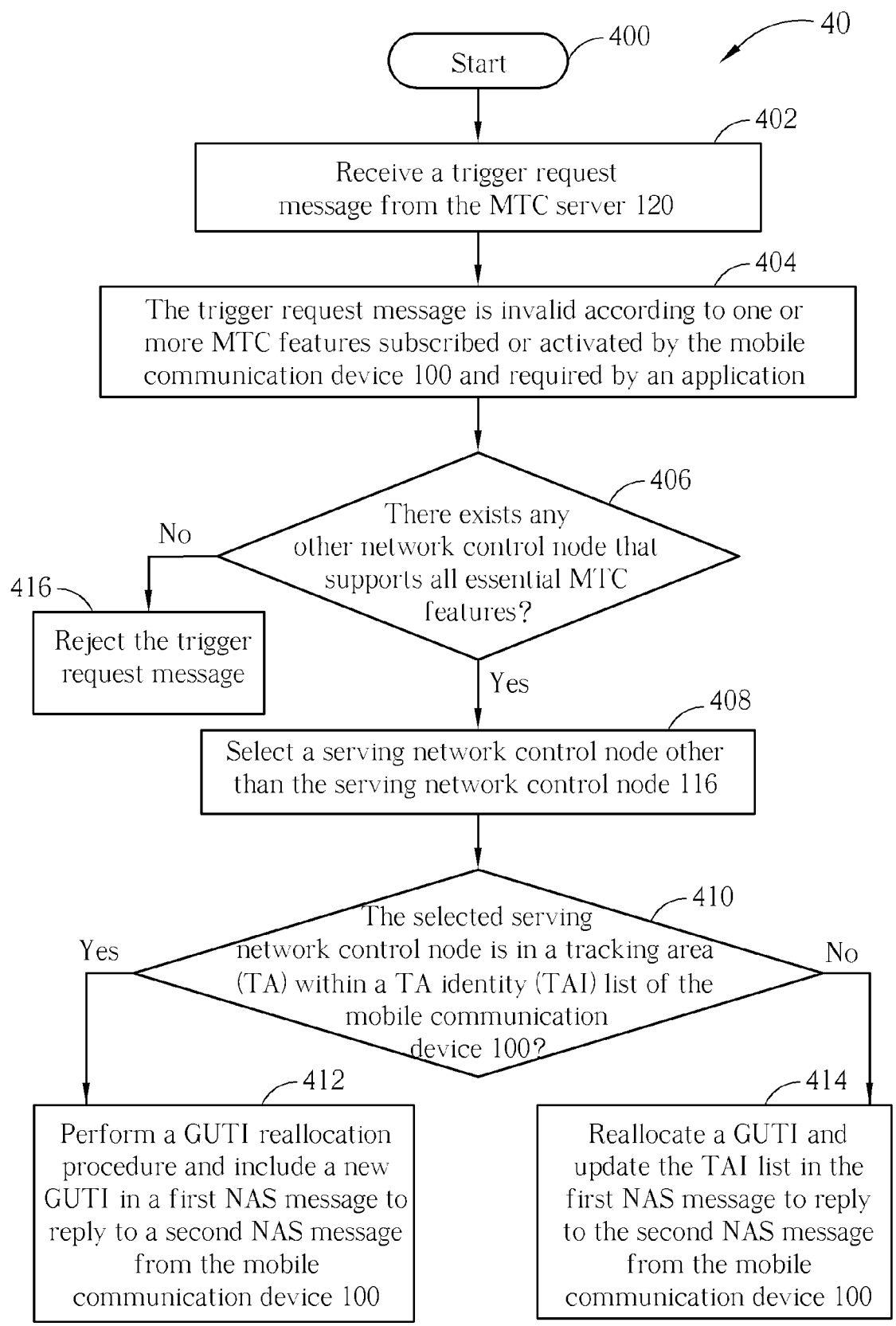

Please refer to FIG. 4, which is a flowchart of an exemplary process 40. The process 40 is used for subscription control in a network node (e.g. network gateway node 117 or network control node 116). The process 40 may be compiled into the program code 214, including the following steps:

Step 400: Start.

Step 402: Receive a trigger request message from the MTC server 120.

Step 404: Determine that the trigger request message is invalid according to one or more MTC features subscribed or activated by the mobile communication device 100 and required by an application.

Step 406: Check whether there exists any other network control node that supports all essential MTC features. If yes, go to Step 408; otherwise, go to Step 416.

Step 408: Select a network control node other than the serving network control node 116.

Step 410: Check whether the selected serving network control node is in a tracking area (TA) within a TA identity (TAI) list of the mobile communication device 100. If yes, go to Step 412; otherwise, go to Step 414.

Step 412: Perform a globally unique temporary identity (GUTI) reallocation procedure and include a new GUTI in a first non-access stratum (NAS) message to reply to a second NAS message from the mobile communication device 100.

Step 414: Reallocate a GUTI and update the TAI list in the first NAS message to reply to the second NAS message from the mobile communication device 100.

Step 416: Reject the trigger request message.

According to the process 40, the network gateway node 117 receives a trigger request message from the MTC server 120 which wants to provide a specific MTC service to the mobile communication device 100 and then initiates a device trigger procedure to trigger the mobile communication device 100.

When the network node (e.g. network gateway node 117 or network control node 116) determines that the trigger request message is invalid, i.e., at least one essential MTC feature required by the application is not supported by serving the network control node 116. The network control node 116 can try to select another network control node which supports the essential MTC features. In detail, if it is the network gateway node 117 determining that the serving network control node 116 lacks of the essential MTC features, the network gateway node 117 can send a message to the serving network control node 116 for selecting another network control node which is capable of providing the essential MTC features. On the other hand, if it is the serving network control node 116 determining that capability of essential MTC features is unavailable, the serving network control node 116 can try to select another network control node before responding to the network gateway node 117. If there is no other network control node being selected, the serving network control node 116 rejects the trigger request message with an appropriate failure cause. On the contrary, if there is one another network control node being selected, the network control node 116 further checks whether the selected network control node is in the tracking area (TA) within the TA identity (TAI) list of the mobile communication device 100. If the selected network control node is in the tracking area (TA) within the TA identity (TAI) list of the mobile communication device 100, the network control node 116 performs a globally unique temporary identity (GUTI) reallocation procedure and includes a new GUTI in the first NAS message to reply to a second NAS message from the mobile communication device 100; otherwise the network control node 116 reallocates a GUTI and updates the TAI list in the first NAS message to reply to the second NAS message from the mobile communication device 100. Specifically, the network control node 116 can initiate a GUTI reallocation procedure to change the serving network control node for the mobile communication device 100 by allocating a new GUTI to the mobile communication device 100. Moreover, the serving network control node 116 can also reallocate a new GUTI by the first NAS message of ATTACH ACCEPT or TAU ACCEPT in response to the second NAS message of ATTACH REQUEST or TAU REQUEST.

Figure 5:
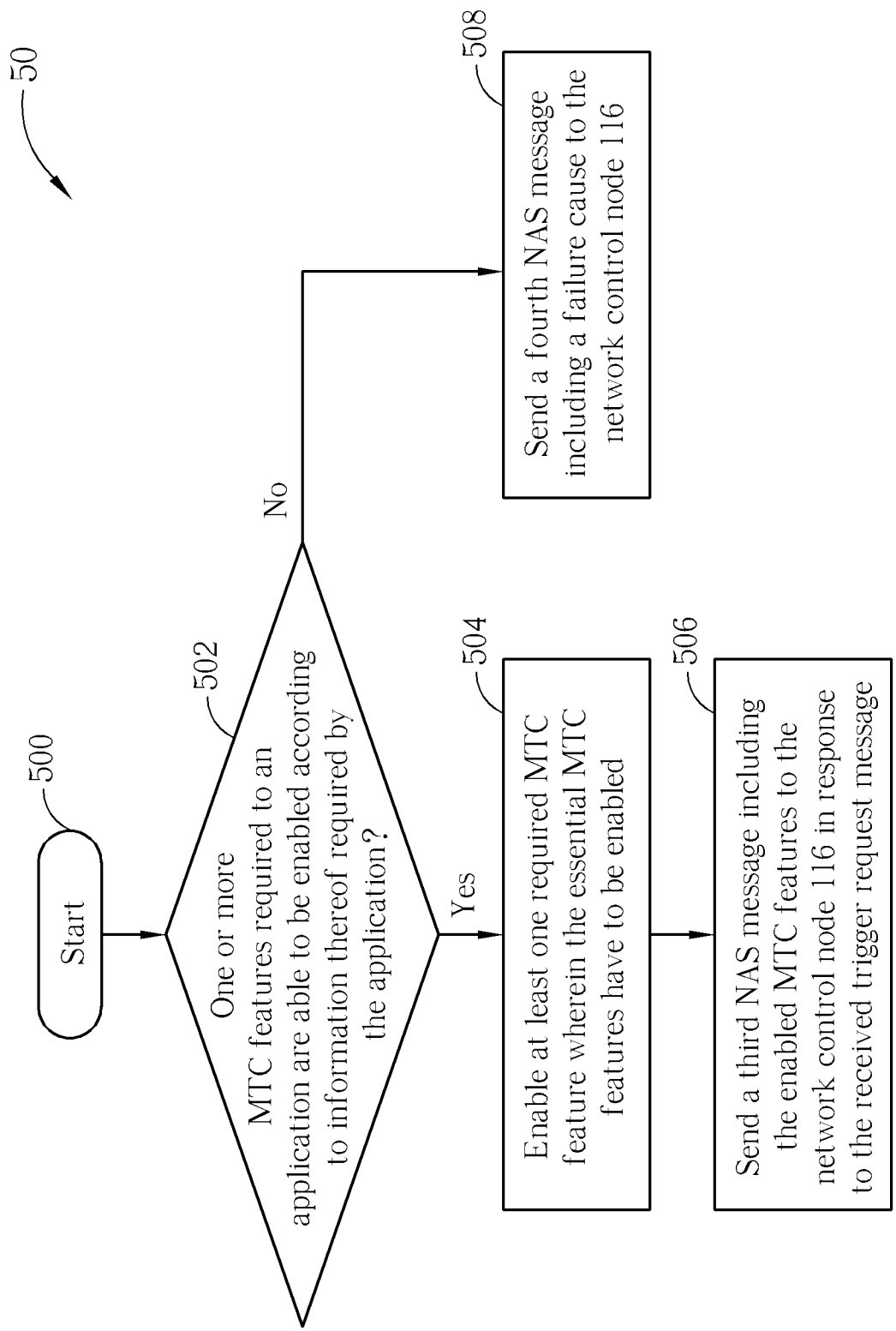

Please refer to FIG. 5, which is a flowchart of an exemplary process 50. The process 50 is used for subscription control in the mobile communication device 100. The process 50 may be compiled into the program code 214, including the following steps:

Step 500: Start.

Step 502: Check whether one or more MTC features required to an application are able to be enabled according to information thereof required by the application. If yes, go to Step 504; otherwise, go to Step 508.

Step 504: Enable at least one required MTC feature wherein the essential MTC features have to be enabled.

Step 506: Send a third NAS message including the enabled MTC features to the network control node 116 in response to the received trigger request message.

Step 508: Send a fourth NAS message including a failure cause to the network control node 116.

The process 50 is performed when the mobile communication device 100 receives the trigger request message. According to the process 50, the mobile communication device 100 determines whether the one or more MTC features associated to the application are enabled according to information of the required MTC features by the application. The mobile communication device 100 enables the required MTC features based on the capability of the mobile communication device 100 and responses the network control node 116 via a third NAS message (e.g. Service Request or Extended Service Request) including the enabled MTC features. If the mobile communication device 100 fails to enable at least one required MTC feature, the mobile communication device 100 responses the network control node 116 via a fourth NAS message, e.g. a NAS reject message or an NAS acknowledge message, with an appropriate failure cause. Note that, the information of the MTC features required by the application can be stored in the mobile communication device 100, or can be acquired from the trigger request message. If the mobile communication device 100 subscribes one or more applications, the mobile communication device 100 needs to store a mapping table between an identifier which can identify a specific service to be triggered on the mobile communication device 100 and the required MTC features. This procedure is to ensure that before the mobile communication device 100 continues to deliver the trigger request message to the target application for the triggering services, the mobile communication device 100 has to enable at least one of required MTC features, wherein essential MTC features have to be all enabled, based on the capability of the mobile communication device 100.

Figure 6:
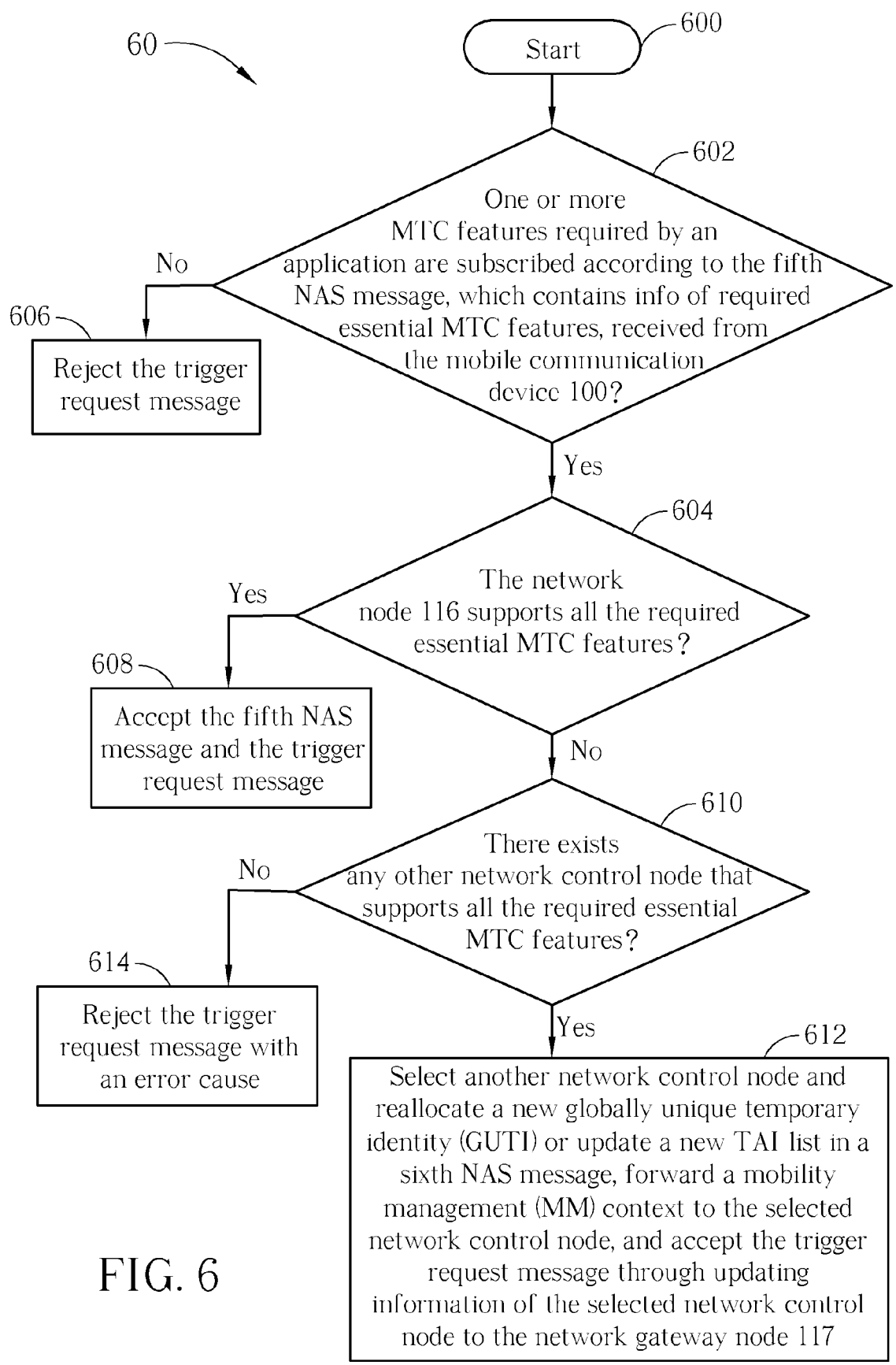

Please refer to FIG. 6, which is a flowchart of an exemplary process 60. The process 60 is used for subscription control in the network control node 116. The process 60 may be compiled into the program code 214, including the following steps:

Step 600: Start.

Step 602: Determine whether one or more MTC features required by an application are subscribed according to the fifth NAS message, which contains info of required essential MTC features, received from the mobile communication device 100. If yes, go to Step 604; otherwise, go to Step 606.

Step 604: Determine whether the network control node 116 supports all the required essential MTC features. If yes, go to Step 608; otherwise, go to Step 610.

Step 606: Reject the trigger request message.

Step 608: Accept the fifth NAS message and the trigger request message.

Step 610: Check whether there exists any other network control node that supports all the required essential MTC features. If yes, go to Step 612; otherwise, go to Step 614.

Step 612: Select another network control node and reallocate a new globally unique temporary identity (GUTI) or update a new TAI list in a sixth NAS message, forward a mobility management (MM) context to the selected network control node, and accept the trigger request message through updating information of the selected network control node to the network gateway node 117.

Step 614: Reject the trigger request message with an error cause.

The process 60 is performed when the network control node 116 receives the fifth NAS message from the mobile communication device 100. The fifth NAS message, e.g. SERVICE REQUEST or EXTENDED SERVICE REQUEST message, is sent by the mobile communication device 100 when the mobile communication device 100 initiates the application to contact the MTC server 120 in response to receiving the trigger request message from the network or being triggered by the application in the mobile communication device 100.

According to the process 60, the network control node 116 determines whether the MTC features required by the application in the fifth NAS message are subscribed. The network control node 116 in the process 60 is preferred to be the serving MME/SGSN/MSC.

If at least one of the MTC features is determined not being subscribed, the network control node 116 rejects the trigger request message. Otherwise, if the MTC features are determined being subscribed, the network node 116 further determine whether all required essential MTC features for the application are supported by the network control node 116.

If the required essential MTC features are determined to be supported, the network control node 116 accepts the trigger request message. Otherwise, if at lease one essential MTC feature is determined not being supported, the network control node 116 tries to select another network control node which supports all the essential MTC features.

If there is another network control node being selected, the network control node 116 reallocates a new GUTI or updates a new TAI list in a sixth NAS message, forwards a MM context of the mobile communication device 100 to the selected network control node, and accepts the trigger request message to the MTC server 120 through updating information of the selected network control node to the network gateway node 117.

Otherwise, if there is no other network control node being selected, the network control node 116 rejects the trigger request message to the MTC server 120, and sends a seventh NAS message, e.g. SERVICE REJECT or EXTENDED SERVICE REJECT message, with an error cause to the mobile communication device 100.

Please note that, the aforementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the invention disclose subscription control procedure for MTC service, where the network node in the core network and the MTC device determine if the trigger request message sent from the MTC server is valid. If the trigger request message is invalid, the network node/MTC device rejects the trigger request message so that the subscription control procedure, which is unnecessary herein, will not be performed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling device triggering in a network gateway node in a mobile communication system, comprising:

receiving a trigger request message from a machine-type communication (MTC) server, wherein the trigger request message is to be delivered to a mobile communication device and used for triggering the mobile communication device to start a MTC service;

determining the trigger request message is to be valid when one or more MTC features indicated in the trigger request message are subscribed or activated by the mobile communication device and are supported by a network control node of the mobile communication system, wherein whether the one or more MTC features indicated in the trigger request message are supported by the network control node is determined by checking capability of the network control node for the one or more MTC features; and when the trigger request message is determined to be valid, accepting the trigger request message and forwarding the trigger request message to the network control node, for forwarding the trigger request message to the mobile communication device, thereby triggering the mobile communication device to start the MTC service; and rejecting the trigger request message when the trigger request message is determined to be invalid;

wherein when the network gateway node does not have the information about the capability of the network control node for the one or more MTC features, the network gateway node includes the information of the one or more MTC features into the trigger request message.

2. The method of claim 1, wherein the network gateway node is a device trigger gateway, a HSS or a HLR, and the network control node is a serving MME or a serving SGSN of the mobile communication device.

3. The method of claim 1, wherein the network gateway node further sends information of the one or more MTC features to the network control node.

4. The method of claim 1, wherein the one or more MTC features comprises one or more essential MTC features, and the trigger request message is valid if the one or more essential MTC features are activated and subscribed, and the trigger request message is invalid if at least one of the one or more essential MTC features is neither activated nor subscribed.

5. The method of claim 1, wherein the network gateway node stores information of the one or more MTC features required by an application.

* * * * *